United States Patent
Nonato de Paula et al.

(10) Patent No.: US 10,138,940 B2
(45) Date of Patent: Nov. 27, 2018

(54) ROLLER BEARING CAGE FOR USE IN A GEARBOX

(71) Applicant: General Electric Company, Schenectady, NY (US)

(72) Inventors: Fabio Nonato de Paula, Niskayuna, NY (US); Yi Han, Mason, OH (US); Joseph Robert Dickman, Monroe, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 67 days.

(21) Appl. No.: 15/232,099

(22) Filed: Aug. 9, 2016

(65) Prior Publication Data
US 2018/0045299 A1    Feb. 15, 2018

(51) Int. Cl.
| | |
|---|---|
| *F16C 33/46* | (2006.01) |
| *F02C 7/36* | (2006.01) |
| *F01D 25/16* | (2006.01) |
| *F02C 7/06* | (2006.01) |
| *F02C 7/32* | (2006.01) |
| *F16H 57/08* | (2006.01) |

(52) U.S. Cl.
CPC .......... *F16C 33/4682* (2013.01); *F01D 25/16* (2013.01); *F02C 7/06* (2013.01); *F02C 7/32* (2013.01); *F02C 7/36* (2013.01); *F05D 2260/40311* (2013.01); *F16C 2360/23* (2013.01); *F16C 2361/61* (2013.01); *F16H 2057/085* (2013.01)

(58) Field of Classification Search
CPC ................ F16C 33/4682; F16C 33/467; F16H 2057/085
See application file for complete search history.

(56) References Cited

U.S. PATENT DOCUMENTS

| | | | | |
|---|---|---|---|---|
| 2,671,315 | A | * | 3/1954 | Rocheville ................ F02C 3/16 60/269 |
| 3,611,834 | A | * | 10/1971 | Dison ....................... F02C 7/36 475/343 |
| 4,403,813 | A | * | 9/1983 | Schaefer ............... F16C 33/467 384/450 |

(Continued)

FOREIGN PATENT DOCUMENTS

| | | |
|---|---|---|
| EP | 2803436 A2 | 11/2014 |
| FR | 2922281 A1 * | 4/2009 ............ F16C 23/086 |

(Continued)

OTHER PUBLICATIONS

Demirhan, Necdet et al.; "Stress and Displacement Distributions on Cylindrical Roller Bearing Rings Using FEM"; Mechanics Based Design of Structures and Machines: An International Journal; vol. 36, Issue 1, 2008; pp. 86-102.

(Continued)

*Primary Examiner* — Sherry L Estremsky
(74) *Attorney, Agent, or Firm* — GE Global Patent Operation; Nitin Joshi

(57) ABSTRACT

A roller bearing cage that includes a cylindrical body including a plurality of pocket holes defined within and positioned circumferentially about the cylindrical body. Each pocket hole includes a pair of side portions and a pair of end portions meeting with the pair of side portions at a corner portion. The corner portion is contoured with a compound radius.

14 Claims, 4 Drawing Sheets

(56) References Cited

U.S. PATENT DOCUMENTS

| | | | |
|---|---|---|---|
| 4,684,268 A * | 8/1987 | Sahlgren | F16C 23/086 |
| | | | 384/572 |
| 6,599,019 B2 * | 7/2003 | Matsui | F16C 33/4623 |
| | | | 384/450 |
| 6,955,476 B1 | 10/2005 | Murai | |
| 7,670,058 B2 | 3/2010 | Shorr et al. | |
| 7,931,410 B2 * | 4/2011 | Tsumori | B21D 53/12 |
| | | | 384/572 |
| 8,123,413 B2 | 2/2012 | Tambe et al. | |
| 8,172,717 B2 | 5/2012 | Lopez et al. | |
| 8,198,744 B2 | 6/2012 | Kern et al. | |
| 8,235,861 B2 | 8/2012 | Lopez et al. | |
| 8,287,423 B2 | 10/2012 | Lopez et al. | |
| 8,298,114 B2 | 10/2012 | Lopez et al. | |
| 8,459,872 B2 | 6/2013 | Nies et al. | |
| 8,491,435 B2 | 7/2013 | Ghanime et al. | |
| 8,506,446 B2 | 8/2013 | Minadeo et al. | |
| 8,517,672 B2 | 8/2013 | McCooey | |
| 8,550,955 B2 | 10/2013 | Erno et al. | |
| 8,550,957 B2 | 10/2013 | Erno et al. | |
| 8,657,714 B1 | 2/2014 | Ghanime et al. | |
| 8,696,314 B2 | 4/2014 | Mashue et al. | |
| 8,727,629 B2 | 5/2014 | Do et al. | |
| 8,727,632 B2 | 5/2014 | Do et al. | |
| 8,777,802 B2 | 7/2014 | Erno et al. | |
| 8,857,192 B2 | 10/2014 | Huang et al. | |
| 8,904,746 B2 | 12/2014 | Fang et al. | |
| 2005/0254742 A1 | 11/2005 | Shibano et al. | |
| 2008/0118198 A1 | 5/2008 | Tsumori et al. | |
| 2016/0377167 A1 * | 12/2016 | Sheridan | F16H 57/0471 |
| | | | 60/226.1 |

FOREIGN PATENT DOCUMENTS

| | | | |
|---|---|---|---|
| JP | 2001330036 A | 11/2001 | |
| JP | 2006342883 A | 12/2006 | |
| WO | WO-2010045933 A1 * | 4/2010 | F16C 33/4682 |

OTHER PUBLICATIONS

Yang et al.; "Dynamic Simulation of Cage in High Speed Cylindrical Roller Bearing Based on Flexible Body Method"; Computer Design and Applications (ICCDA); Jun. 25-27, 2010; vol. 3, pp. 590-594.

* cited by examiner

ROLLER BEARING CAGE FOR USE IN A GEARBOX

BACKGROUND

The present disclosure relates generally to an epicyclic gearbox assembly and, more specifically, to a roller bearing cage having pocket holes contoured for reducing the magnitude of stress concentrations formed in the roller bearing cage.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

The drive shafts in the turbine engine are typically supported by one or more bearings, and at least some known turbofans include a speed-reducing gearbox coupled along the drive shaft between the low-pressure turbine and the fan. The gearbox facilitates decoupling the fan tip speed from the speed of the low-pressure turbine. For example, at least some known gearboxes include a sun gear engaged with and rotatably mounted radially inward relative to a plurality of planetary gears. The planetary gears each include a roller bearing cage having a plurality of pocket holes sized to receive roller elements therein. In operation, the planetary gears sometimes rotate circumferentially about the sun gear, and also rotate about an axis. As the rotational speed of the planetary gears increases, a roller web force and increased centrifugal loading forms stress concentrations at predetermined regions of the roller bearing cage, such as at the pocket holes. The stress concentrations can result in reducing the service life of the planetary gears.

BRIEF DESCRIPTION

In one aspect, a roller bearing cage is provided. The roller bearing cage includes a cylindrical body including a side wall defining a plurality of pocket holes defined within and positioned circumferentially about the cylindrical body. Each pocket hole includes a pair of side portions and a pair of end portions meeting with the pair of side portions at a corner portion. The corner portion is contoured with a compound radius.

In another aspect, a gearbox for use in a turbine engine is provided. The gearbox includes a central gear and a plurality of planetary gears positioned circumferentially about the central gear and configured to rotate relative to the central gear. Each planetary gear includes a roller bearing cage that includes a cylindrical body including a side wall defining a plurality of pocket holes defined within and positioned circumferentially about the cylindrical body. Each pocket hole includes a pair of side portions and a pair of end portions meeting with the pair of side portions at a corner portion. The corner portion is contoured with a compound radius.

In yet another aspect, a turbine engine assembly is provided. The assembly includes a fan section, a turbine section, and a gearbox coupled between the fan section and the turbine section. The gearbox includes a plurality of planetary gears that each include a roller bearing cage. The roller bearing cage includes a cylindrical body including a plurality of pocket holes defined in the cylindrical body. At least a portion of each pocket holes is contoured with a compound radius.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the roller bearing cage. Moreover, the terms "radial" and "radially" refer to directions and orientations that extend substantially perpendicular to the centerline of the turbine engine or the roller bearing cage. In addition, as used herein, the terms "circumferential" and "circumferentially" refer to directions and orientations that extend arcuately about the centerline of the turbine engine or the roller bearing cage.

Embodiments of the present disclosure relate to a roller bearing cage having pocket holes contoured for reducing the magnitude of stress concentrations formed in the roller bearing cage. More specifically, the pocket holes are contoured with a compound radius that increases in radial size at predetermined regions of the roller bearing cage. The compound radius defines a sweeping and smoother profile when compared to a single radius fillet or an abrupt corner junction. As such, the shape of the pocket holes facilitates mitigating strain on the roller bearing cage, and enables the roller bearing cage to withstand greater centrifugal loads when compared to other known alternatives.

Figure 1:
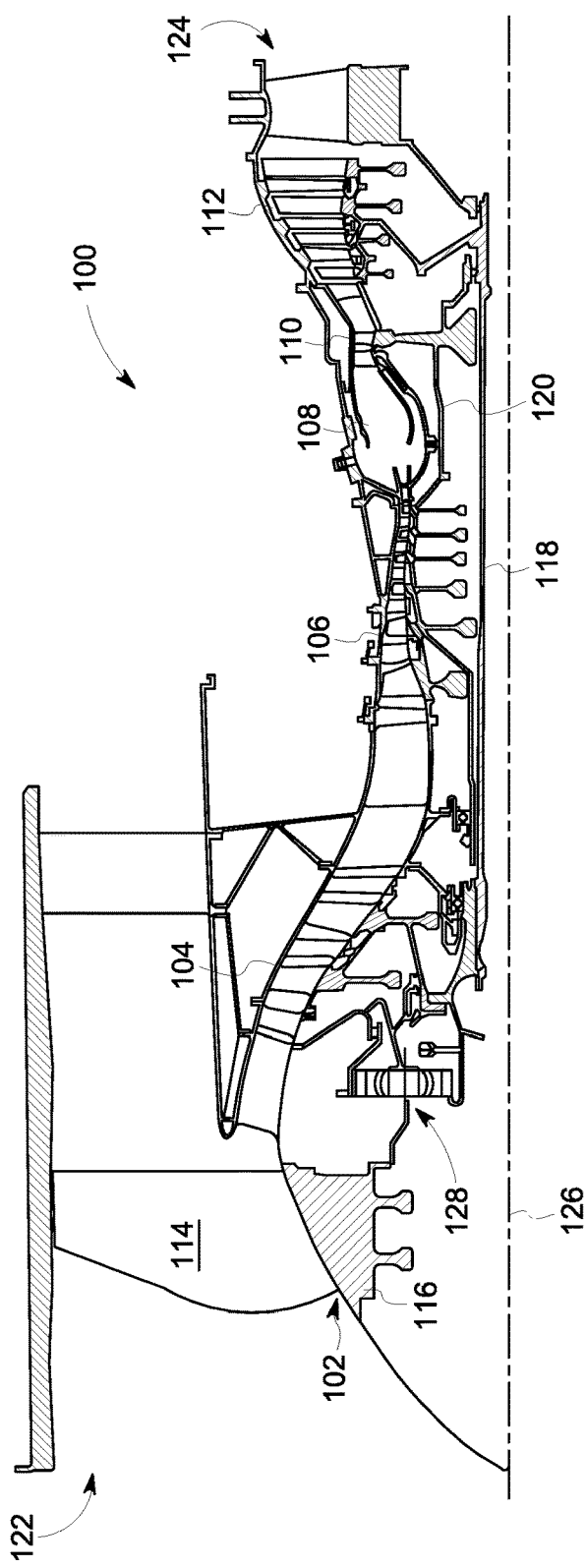
FIG. 1 is a schematic illustration of an exemplary turbine engine assembly.

FIG. 1 is a schematic illustration of an exemplary turbine engine assembly 100 including a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine assembly 100 also includes a high-pressure turbine 110 coupled in flow communication with combustor 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine assembly 100 has an intake 122 and an exhaust 124. Turbine engine assembly 100 further includes a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine 112.

In operation, air entering turbine engine assembly 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor 108, mixed with fuel, and the mixture is combusted within combustor 108. High temperature combustion gas generated by combustor 108 is channeled towards turbine assemblies 110 and 112. Low-pressure turbine 112 rotates at a first rotational speed, and gearbox 128 operates such that fan assembly 102 operates at a second rotational speed lower than the first rotational speed. Combustion gas is subsequently discharged from turbine engine assembly 100 via exhaust 124. In an alternative embodiment, the rotational speeds of low-pressure turbine 112 and fan assembly 102 are decoupled by any mechanism or arrangement of components that enables turbine engine assembly 100 to function as described herein.

Figure 2:
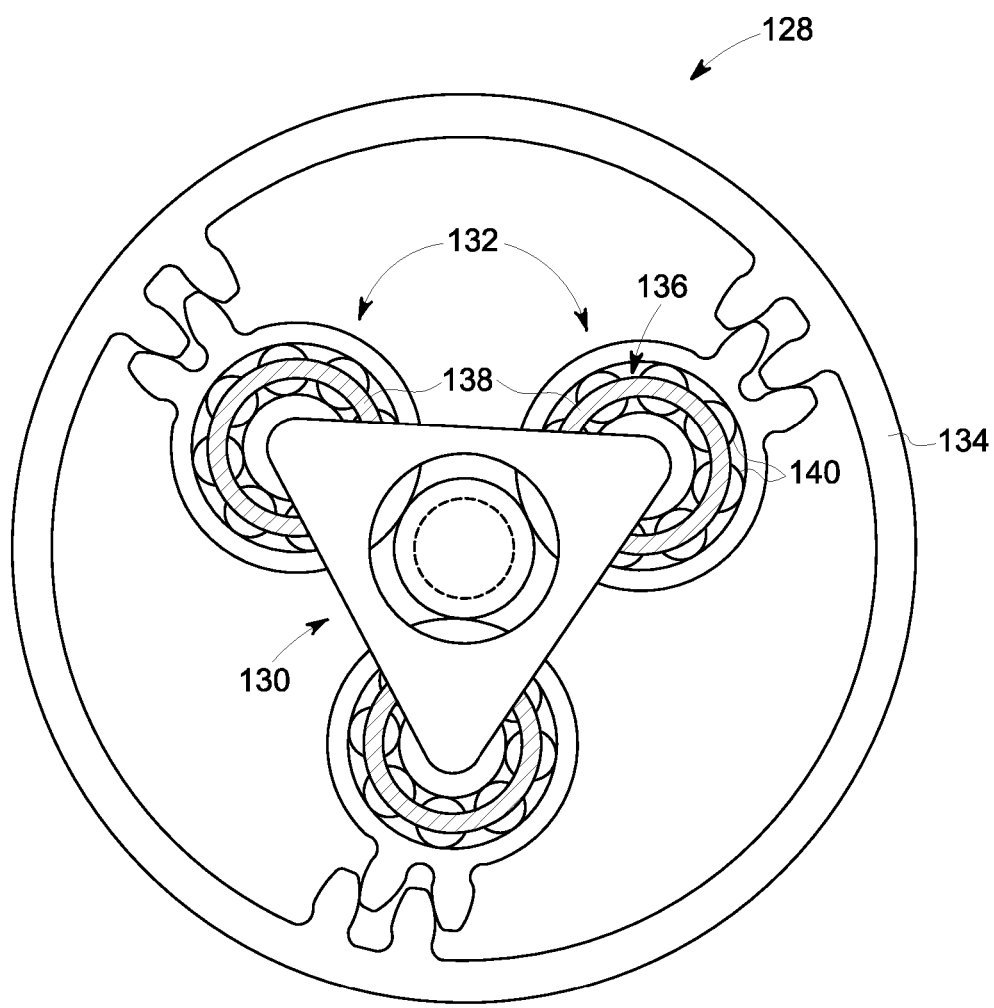
FIG. 2 is an end view of an exemplary gearbox that may be used in the turbine engine assembly shown in FIG. 1.

FIG. 2 is an end view of gearbox 128 that may be used in turbine engine assembly 100 (shown in FIG. 1). In the exemplary embodiment, gearbox 128 includes a least one sun or central gear 130, and a plurality of planetary gears 132 that are each rotatably coupled to central gear 130. Gearbox 128 further includes a ring gear 134 coupled to and extending about the plurality of planetary gears 132. The plurality of planetary gears 132 are positioned circumferentially about central gear 130, and rotate relative to central gear 130 during operation of gearbox 128. As described above, central gear 130 and planetary gears 132 cooperate to produce differential speeds for different portions of turbine engine assembly 100.

In the exemplary embodiment, each planetary gear 132 includes a bearing assembly 136 that operates to facilitate rotating planetary gears 132 freely with respect to central gear 130, and to facilitate rotating planetary gears 132 about central gear 130 upon actuation of ring gear 134. Bearing assembly 136 includes a roller bearing cage 138 and a plurality of roller elements 140 at least partially housed within roller bearing cage 138. More specifically, roller elements 140 are received within respective pocket holes (not shown) defined within roller bearing cage 138, as will be described in more detail below.

Figure 3:
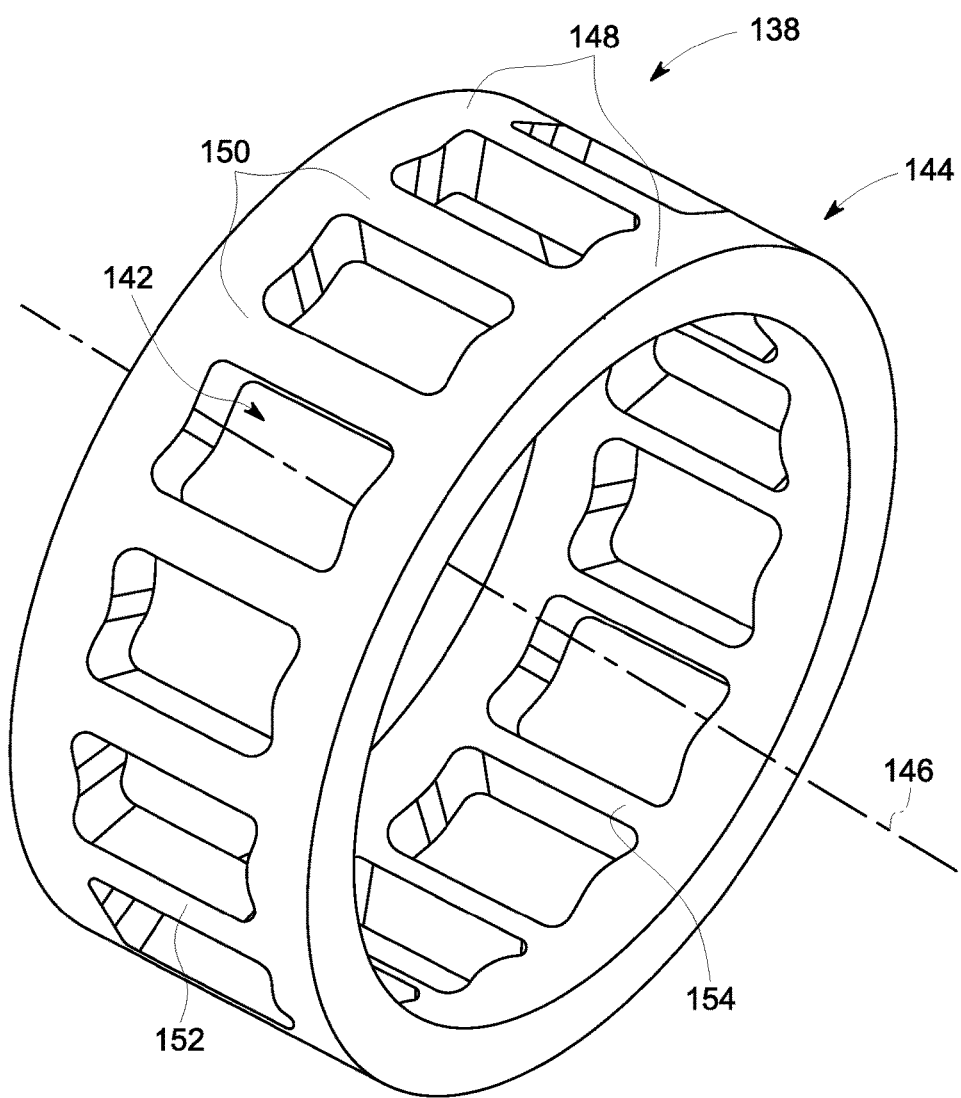
FIG. 3 is a perspective view of an exemplary roller bearing cage that may be used in the gearbox shown in FIG. 2.
Figure 4:
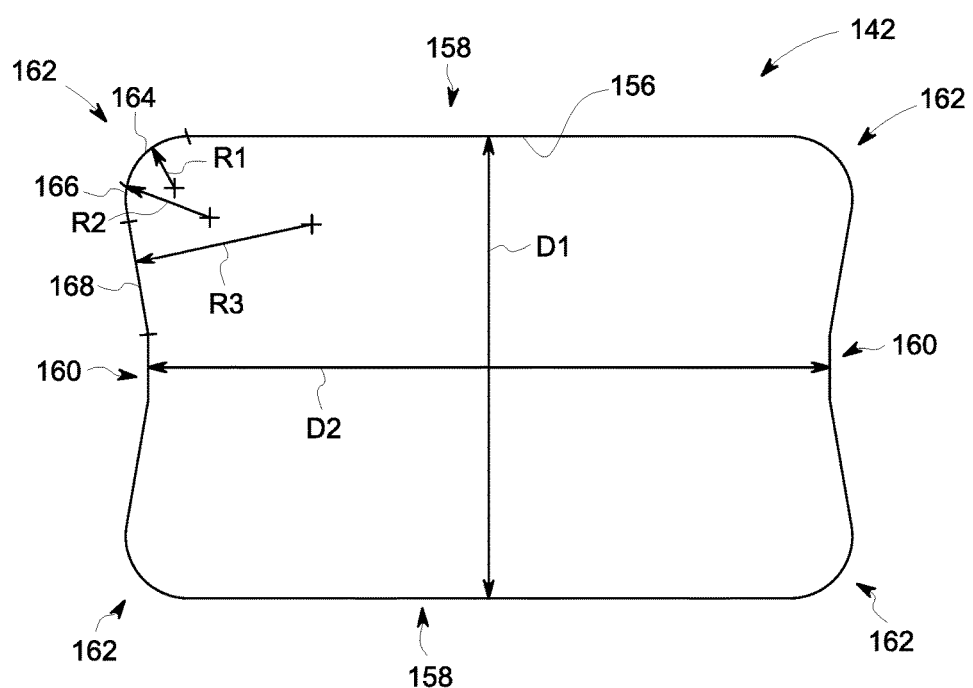
FIG. 4 is a profile view of an exemplary pocket hole that may be used in the roller bearing cage shown in FIG. 3.

FIG. 3 is a perspective view of an exemplary roller bearing cage 138 that may be used in gearbox 128 (shown in FIG. 2), and FIG. 4 is a profile view of an exemplary pocket hole 142 that may be used in roller bearing cage 138. In the exemplary embodiment, roller bearing cage 138 includes a cylindrical body 144 including a plurality of pocket holes 142 defined within and positioned circumferentially about cylindrical body 144. Specifically, pocket holes 142 are positioned circumferentially relative to a centerline 146 of cylindrical body 144. Roller bearing cage 138 further includes a pair of circumferential side rails 148 and a plurality of web members 150 extending between the pair of circumferential side rails 148, such that pocket holes 142 are defined therebetween. In addition, pocket holes 142 are formed within cylindrical body 144 such that an outer radial portion 152 of web members 150 is thicker than an inner radial portion 154 of web members 150.

As described above, roller elements 140 (shown in FIG. 2) are received within respective pocket holes 142. More specifically, roller elements 140 are radially inserted within each pocket hole 142. Pocket holes 142 are oversized relative to roller elements 140 such that roller elements 140 freely move within pocket holes 142 and are forced against circumferential side rails 148 and/or web members 150 when a centrifugal load is induced during operation of gearbox 128. As such, roller bearing cage 138 guides circumferential and axial movement of roller elements 140 through pocket holes 142.

Referring to FIG. 4, pocket hole 142 defines a side wall 156 within cylindrical body 144 (shown in FIG. 3), and includes a pair of side portions 158, a pair of end portions 160, and a corner portion 162 positioned between each side portion 158 and each end portion 160. The pair of side portions 158 are spaced from each other by a first distance D1 and the pair of end portions 160 are spaced from each other by a second distance D2 equal to or greater than first distance D1. In addition, the pair of side portions 158 and the pair of end portions 160 are oriented perpendicularly relative to each other. As such, side wall 156 at side portions 158 restrict circumferential movement of roller elements 140 (shown in FIG. 2) within pocket hole 142, and side wall 156 at end portions 160 restrict axial movement of roller elements 140 within pocket hole 142.

Corner portion 162 is contoured with a compound radius to facilitate reducing the magnitude of stress concentrations formed in roller bearing cage 138 (shown in FIG. 3). In general, abrupt changes in the geometric shape of an object results in an increased stress concentration effect. In the exemplary embodiment, corner portion 162 increases in radial size from each side portion 158 towards each end portion 160, thereby defining a sweeping and smoother profile when compared to a single radius fillet or an abrupt corner junction between side portions 158 and end portions 160. As will be described in more detail below, the sweeping and smoother profile is defined at predetermined regions of roller bearing cage 138 having high stress concentrations when subjected to a centrifugal load. As such, the profile of corner portion 162 facilitates mitigating strain and reduces stress concentrations formed within roller bearing cage 138 at corner portion 162.

In the exemplary embodiment, corner portion 162 includes at least two radial sections that each have a different radial size to facilitate forming the compound radius. For example, in one embodiment, corner portion 162 includes a first radial section 164, a second radial section 166, and a third radial section 168. First radial section 164 has a first radius R1, second radial section 166 has a second radius R2 greater than first radius R1, and third radial section 168 has a third radius R3 greater than second radius R2. In addition, first radial section 164 extends from each side portion 158, second radial section 166 extends from first radial section 164 and towards each end portion 160, and third radial section 168 extends from second radial section 166 towards each end portion 160. As such, second radial section 166 and third radial section 168 are located in predetermined regions of roller bearing cage 138 along circumferential side rails 148 (shown in FIG. 2) having high stress concentrations when subjected to a centrifugal load. In an alternative embodiment, corner portion 162 includes any number of radial sections having different radial sizes that enables roller bearing cage 138 to function as described herein.

First radius R1, second radius R2, and third radius R3 have any size that enables roller bearing cage 138 to function as described herein. For example, in one embodiment, the size of first radius R1 is predetermined to facilitate reducing interference of side wall 156 with rotation of roller element 140 within pocket hole 142. In addition, second radius R2 and third radius R3 are sized as a function of first radius R1. For example, in one embodiment, second radius R2 is greater than or equal to two times the size of radius R1, and third radius R3 is greater than or equal to three times the size of radius R1.

In addition, first radius R1, second radius R2, and third radius R3 are sized and oriented as a function of a thickness of inner radial portion 154 of web members 150 (shown in FIG. 3). For example, the thickness of web members 150 decreases when portions of adjacent pocket holes 142 converge towards each other in the circumferential direction relative to centerline 146 (shown in FIG. 3). As described above, inner radial portion 154 of web members 150 has a smaller thickness than outer radial portion 152 (all shown in FIG. 3). In one embodiment, first radius R1, second radius R2, and third radius R3 are sized and oriented such that inner radial portion 154 has a thickness equal to or greater than a predetermined thickness.

Embodiments of the roller bearing cage, as described above, enable the use of high speed, small reduction ratio, planetary integral drive systems. More specifically, bearings of planetary integral drive systems are subjected to high centrifugal loads as a result of rotation of the planet carrier. Pocket holes in the roller bearing cage are contoured with a compound radius that increases in radial size at predetermined regions of the roller bearing cage. The compound radius defines a sweeping and smoother profile when compared to a single radius fillet or an abrupt corner junction. As such, the shape of the pocket holes facilitates mitigating strain on the roller bearing cage, and enables the roller bearing cage to withstand greater centrifugal loads caused by rotation of the planet carrier.

An exemplary technical effect of the roller bearing cage described herein includes at least one of: (a) reducing the magnitude of stress concentrations formed in the roller bearing cage; (b) increasing the service life of planetary gears in a gear assembly; and (c) enabling the planetary gears to be operated with greater centrifugal loading.

Exemplary embodiments of gear assembly and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine assembles and related methods as described herein. Rather, the exemplary embodiment can be implemented and utilized in connection with many applications where increasing the service life of a bearing is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A roller bearing cage comprising:
   a cylindrical body comprising a side wall defining a plurality of pocket holes positioned circumferentially about said cylindrical body, wherein each pocket hole comprises:
      a pair of side portions;
      a pair of end portions meeting with said pair of side portions at a corner portion, wherein said corner portion is contoured with a compound radius;
   wherein said corner portion comprises a first radial section and a second radial section, said first radial section having a first radius and said second radial section having a second radius greater than the first radius; and
   wherein said corner portion further comprises a third radial section having a third radius greater than the second radius, said third radial section extending from said second radial section and towards said each end portion.

2. The roller bearing cage in accordance with claim 1, wherein said corner portion increases in radial size from said each side portion towards said each end portion.

3. The roller bearing cage in accordance with claim 1, wherein said first radial section extends from said each side portion and said second radial section extends from said first radial section and towards said each end portion.

4. The roller bearing cage in accordance with claim 1, wherein said pair of side portions are spaced from each other by a first distance and said pair of end portions are spaced from each other by a second distance equal to or greater than the first distance.

5. The roller bearing cage in accordance with claim 1, wherein said pair of side portions and said pair of end portions are oriented perpendicularly relative to each other.

6. A gearbox for use in a turbine engine, said gearbox comprising:
   a central gear;
   a plurality of planetary gears positioned circumferentially about said central gear and configured to rotate relative to said central gear, each planetary gear comprising a roller bearing cage that comprises:
      a cylindrical body comprising a side wall defining a plurality of pocket holes positioned circumferentially about said cylindrical body, wherein each pocket hole comprises:
         a pair of side portions;
         a pair of end portions meeting with said pair of side portions at a corner portion, wherein said corner portion is contoured with a compound radius;
      wherein said corner portion comprises a first radial section and a second radial section, said first radial section having a first radius and said second radial section having a second radius greater than the first radius; and
      wherein said corner portion further comprises a third radial section having a third radius greater than the second radius, said third radial section extending from said second radial section and towards said each end portion.

7. The gearbox in accordance with claim 6, wherein said corner portion increases in radial size from said each side portion towards said each end portion.

8. The gearbox in accordance with claim 6, wherein said first radial section extends from said each side portion and said second radial section extends from said first radial section and towards said each end portion.

9. The gearbox in accordance with claim 6, wherein said pair of side portions are spaced from each other by a first distance and said pair of end portions are spaced from each other by a second distance greater than the first distance.

10. The gearbox in accordance with claim 6, wherein said pair of side portions and said pair of end portions are oriented perpendicularly relative to each other.

11. A turbine engine assembly comprising:
    a fan section;
    a turbine section;
    a gearbox coupled between said fan section and said turbine section, said gearbox comprising a plurality of planetary gears that each comprise a roller bearing cage, said roller bearing cage comprising:
       a cylindrical body that comprises a plurality of pocket holes defined in said cylindrical body, wherein at least a portion of each pocket holes is contoured with a compound radius;
    wherein said corner portion comprises a first radial section and a second radial section, said first radial section having a first radius and said second radial section having a second radius greater than the first radius; and
    wherein said corner portion further comprises a third radial section having a third radius greater than the second radius, said third radial section extending from said second radial section and towards said each end portion.

12. The turbine engine assembly in accordance with claim 11, wherein each pocket hole comprises:
    a pair of side portions;
    a pair of end portions; and
    a corner portion positioned between each side portion and each end portion, wherein said corner portion is contoured with the compound radius.

13. The gearbox in accordance with claim 12, wherein said corner portion increases in radial size from said each side portion towards said each end portion.

14. The gearbox in accordance with claim 11, wherein said first radial section extends from said each side portion and said second radial section extends from said first radial section and towards said each end portion.

* * * * *